A. S. OLIVER, Jr.
STEERING POST LIGHT.
APPLICATION FILED DEC. 13, 1913.
1,105,370.
Patented July 28, 1914.
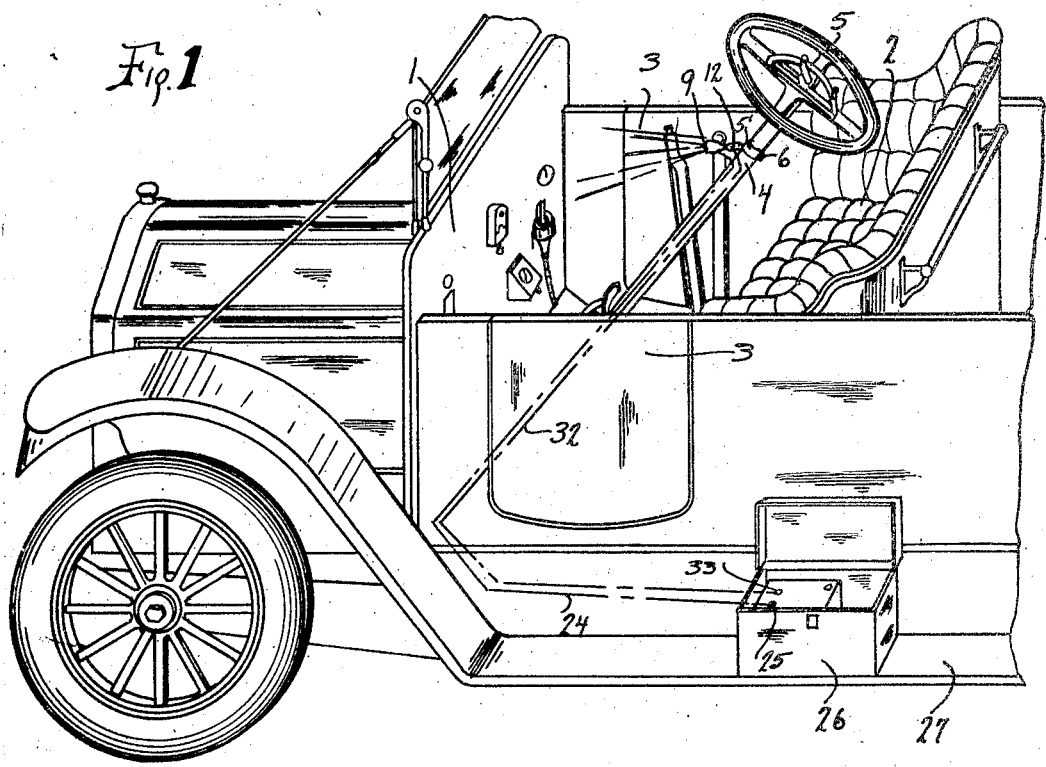
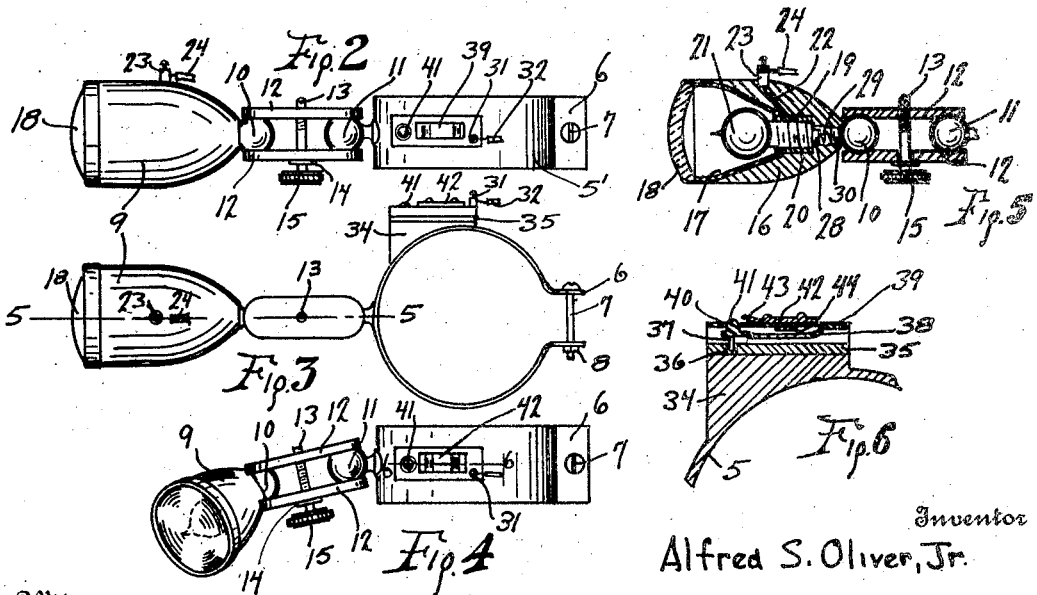
Witnesses
Harold Scantlebury
Edna Broyles
Inventor
Alfred S. Oliver, Jr.
By Herbert E. Smith
Attorney

UNITED STATES PATENT OFFICE.

ALFRED S. OLIVER, JR., OF MEDICAL LAKE, WASHINGTON.

STEERING-POST LIGHT.

1,105,370.    Specification of Letters Patent.    Patented July 28, 1914.

Application filed December 12, 1913. Serial No. 306,590.

*To all whom it may concern:*

Be it known that I, ALFRED S. OLIVER, JR., a citizen of the United States, residing at Medical Lake, State of Washington, have invented new and useful Improvements in Steering-Post Lights, of which the following is a specification.

This invention has for its object the provision of illuminating means on the steering post of an automobile for rendering the various indicators on the dash board visible and readable at night time.

A further object is to provide illuminating means which is readily adjustable for projection of its rays upon indicators of time, such as clocks and the magneto switch, storage battery gage, speedometer and other paraphernalia which may be located at variously different points between the front seat and dash board.

A further object is to provide an improved handy switch whereby the illuminating means, if in the form of an incandescent lamp, may be readily cut into and out of circuit, this feature including the novel idea of embodying the illuminating means with a device for attachment to the steering post and also the handy switch, all in a unitary structure.

Other features of novelty will be more fully described in connection with the accompanying drawing and will be more particularly pointed out in and by the appended claims.

In the drawing:—Figure 1 is a perspective view of an automobile looking at that portion between the front seat and the dash board. Fig. 2 is a view in side elevation of the unitary structure embodying the device of my invention. Fig. 3 is a plan view thereof. Fig. 4 is a view similar to Fig. 2 showing the device in one of the several positions into which it can be adjusted. Fig. 5 is a sectional view on line 5—5 of Fig. 3. Fig. 6 is a sectional view on line 6—6 of Fig. 4.

Like characters of reference designate similar parts throughout the different figures of the drawing.

As illustrated, 1 designates the dash or dash board of an automobile on which is disposed the usual indicating paraphernalia which need not be separately designated but which is usually disposed in convenient readable proximity to the front seat occupant, the front seat being indicated at 2. In many constructions the sides 3 have pockets and sometimes the gasolene tank is disposed beneath the front seat and by reason of the fact that the head lights do not even remotely illuminate rearwardly thereof, the space between the dash and the front seat is always dark at night and it is with difficulty that readings can be made and necessary operations of other character carried out.

A steering post is indicated at 4 on which a steering wheel 5 is disposed and the device of my invention is mounted on the steering post below the steering wheel so as to effectively illuminate the area between the dash and seat 2.

Referring more particularly to the specific construction shown, $5^1$ designates clamping means for embracing the steering post and the same may comprise a thin strap or strip of resilient metal having lug ends 6 through which a bolt 7 is passed, a nut 8 serving to provide the necessary grip.

An electric lamp and an inclosing reflector structure therefor is generally indicated at 9 and I provide improved means for mounting the lamp to the clamp in such a manner as to afford the greatest possible range of adjustment for the lamp, the said means being constructed and arranged to maintain the lamp in positions to which it may be adjusted. As illustrated, said means is in the form of a double ball and socket construction and I secure to the lamp structure and to the clamp structure, balls 10 and 11, respectively. The sockets are in the form of socket members 12 which are provided with recessed ball receiving terminals, as will be seen more particularly by reference to Fig. 5. I connect the socket members 12 by means of a clamping screw 13 which has threaded engagement with one of said members 12 and a shoulder engagement, as at 14, with the other of said members. A knurled head 15 affords the necessary grip for turning the screw to increase or decrease frictional engagement with the balls 11. It will be seen that by providing suitable pressure engagement, enough friction can be maintained to retain the lamp in any position to which it may be adjusted. Furthermore, the lamp is adjustable universally about two spaced universal joints so that it is capable of being swung about one and additionally adjusted about the other. Adjustment can be effected to project the rays of the lamp upon any of the indicating devices on the dash or the lamp can be manipulated to glow against the sides or beneath the seat.

In cases where I employ an electric lamp I may embody the same in an outer non-conducting reflector structure 16 having a reflector proper 17, and a glass 18. Within the reflector structure I dispose a socket 19, for threaded connection with the base 20 of an electric lamp 21 which is preferably of sufficiently low candle power to be run by a battery. The socket 19 is connected by wire 22 with a terminal 23 which I mount upon the reflector structure 16. A conductor 24 leads from the terminal 23 to one terminal 25 of a source of current which is in the form of a storage battery at 26 mounted on the running board 27. The location and the character of battery are of course immaterial to the invention. The remaining terminal 28, of the lamp, 20 being the other terminal or pole, is connected by a conductor which may be in the form of a spring 29 with a stud 30 formed on ball 10, and on which stud the reflector structure 16 is mounted. Circuit is completed through ball 10 and socket members 12 and through ball 11 to clamp 5 and therethrough from a terminal 31 by a lead 32 to the other terminal 33 of the source of current.

I bridge into the circuit just described, a novel form of handy switch which is embodied in the following structure: At one point on the clamp 5 I provide an enlargement 34 on which a base of insulating material 35 is disposed. An opening 36 in the insulating base affords contact with 34 by means of a contact stud 37 mounted upon a spring 38 which normally serves to dispose the stud 37 in spaced or open circuit relation with respect to 34. A casing 39 is provided with an opening 40 through which an insulated head 41 of the stud 37 projects. In order to move the stud 37 into a circuit closing position I provide means which may be in the form of a slide 42 which is mounted to be moved on the casing 39, under manual stress, and which is provided with an upturned end 43 adapted to ride over the head 41. The slide 42 may be slidably held on the casing 39 by a projection 44, or in any desirable manner. By means of this switch the user can readily cause the lamp to glow for the usual short periods of time when illumination is necessary and at other times the lamp can be cut out for battery economy.

It is believed that the advantages and utility of my invention will be fully understood from the foregoing description and while I have herein shown one specific form of my invention I do not wish to be limited thereto except for such limitations as the claims may import.

I claim:—

1. As a means for illuminating indicators and other paraphernalia between the dash and front seat of an automobile, a steering post between the dash and front seat, an electric lamp, universally movable means for mounting said lamp on said post and provided with a switch for cutting said lamp into and out of circuit, substantially as described.

2. As a means for illuminating indicators and other paraphernalia between the dash and front seat of an automobile, a steering post between the dash and front seat, an electric lamp, clamping means for engagement with the steering post and provided with a switch having one terminal for connection with one pole of a source of circuit, means connecting said lamp with the clamping means for universal movement of the former and electrically connecting said lamp with one terminal of the switch, and a terminal on said lamp for connection with the other pole of the source of circuit, substantially as described.

In testimony whereof I hereby affix my signature in the presence of two subscribing witnesses.

ALFRED S. OLIVER, Jr.

Witnesses:
D. G. WAKEFIELD,
R. CAMPBELL.